Feb. 17, 1959
J. M. BELL
2,874,354
CALIBRATING CIRCUIT FOR CURRENT MEASURING SYSTEMS
Filed Oct. 15, 1954
2 Sheets-Sheet 1
FIG. 1.
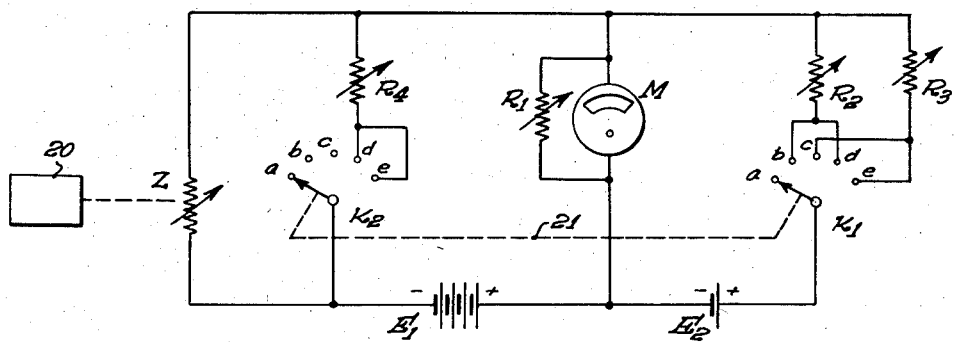
FIG. 2.
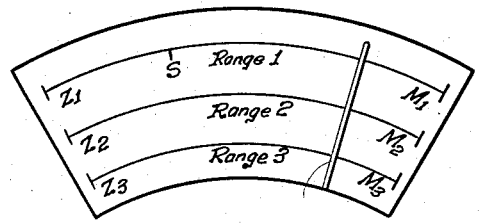
FIG. 2A.
| | ← Range 1 → | ← Range 2 → | ← Range 3 → | |
|---|---|---|---|---|
| A | $Z_1$ | $M_1$ $Z_2$ | $M_2$ $Z_3$ | $M_3$ |
| B | 0 | $N$ | $2N$ | $3N$ |
| C | $X \cdot 10^n$ | $X \cdot 10^{2n}$ | $X \cdot 10^{2n}$ | $X \cdot 10^{3n}$ |
| D | $10^{-5}$ | $10^{-2}$ | $10$ | $10^4$ |
JOHN M. BELL,
INVENTOR.
By
Barbier & Scantlebury
ATTORNEYS.

JOHN M. BELL,
INVENTOR.

BY
Barkelew + Scantlebury
ATTORNEYS.

United States Patent Office 2,874,354
Patented Feb. 17, 1959

2,874,354
CALIBRATING CIRCUIT FOR CURRENT MEASURING SYSTEMS

John M. Bell, Altadena, Calif., assignor, by mesne assignments, to Panellit, Inc., a corporation of Illinois Application October 15, 1954, Serial No. 462,565

4 Claims. (Cl. 324—130)

This invention has to do with electrical systems for measuring an electrical current. Such systems are especially useful for measuring a physical quantity in terms of an electrical current that it produces. The invention is concerned more particularly with such current measuring systems that are shiftable among a plurality of alternative contiguous ranges of response, and with circuit means for facilitating the calibration of a plurality of such ranges in terms of a reference standard that is required to produce only one standard value of electrical current.

The present invention has to do with systems in which the final indicating or recording device may be of many different types, but in which the latitude of direct response of that device is definitely limited. For example, the response of a conventional microammeter is mechanically limited to the angular range of pointer movement that is permitted by the suspension, and the effective response is ordinarily further limited by the length of the calibrated scale. Indication may be made in many ways other than by a pointer, and need not be directly visible. For example, indication may be made in terms of the loudness of an audible signal, or the frequency of a radio wave. But the latitude of response is still ordinarily limited to some definable effective range. For convenience of reference, and without implying any necessary limitation upon its nature, the current measuring or indicating device will be referred to as a meter, and its effective lower and upper limits of direct response will be referred to as zero deflection and full scale deflection, respectively.

It is a usual practice in current measuring systems to provide switching means for selectively supplying to the meter an electric current of predetermined magnitude and of polarity opposite to that of the current to be measured. Such a "bucking current," as it will be called, may, for example, correspond in magnitude to normal full scale deflection of the meter. A reading of zero with the bucking current applied then has the same significance as a reading of full scale when no bucking current is applied. Such a switchable bucking circuit doubles the effective range of the system. For example, if readings from zero to full scale represent current values from zero to 10 microamperes with the bucking circuit open, the same readings may represent current values from 10 to 20 microamperes with the bucking circuit operating. A second bucking circuit may be provided, supplying a bucking current twice the magnitude of the first, thereby affording a third effective range in which readings from zero to full scale would represent, in the example cited, current value from 20 to 30 microamperes.

In systems of the type described it may be necessary or desirable to check the calibration of the system, and to readjust the bucking circuit when required. That is particularly true if the input current to the system is derived from a physical quantity and the meter reading is taken as a measure of that quantity, the meter being then preferably calibrated directly in terms of the physical quantity to be measured. A calibration check of the measuring system may then be required by changes in the input means by which the input current is derived from the physical quantity to be measured, as well as by changes in the measuring system itself. An overall calibration check of that type requires the availability of a calibration standard in the form of a known value of the physical quantity to be measured. It is not always convenient, however, to provide such a known standard within each of the plurality of ranges of response to the system. The present invention is particularly concerned with means for facilitating the checking of a plurality of ranges of such a system by reference to a single standard value.

That is accomplished, in general terms, by providing an adjustable auxiliary source of current in parallel with the input of the current that is to be measured. The auxiliary source of current is first adjusted by reference to one range of the measuring circuit, and is then utilized to provide a calibration value in a second range of that circuit. If required, another auxiliary current source may then be adjusted by reference to the calibrated second range of the measuring circuit, and employed to check the calibration of a third range.

For purposes of illustration, the invention will be described with specific reference to a system for measuring high energy radiation by means of an ionization chamber. In systems of that type it is often inconvenient, and may be entirely impracticable, to obtain a variety of different standard sources of radiation that extend over a wide enough range to permit direct calibration of all required ranges of response of the instrument. Moreover, compliance with special rules and procedures is required in connection with standard sources of radiation containing more than one microcurie of radioactive material. It is therefore particularly advantageous in instruments for measuring high energy radiation to provide means for checking the calibration of all ranges of the instrument in terms of a standard source of relatively low intensity.

A full understanding of the invention and of its further objects and advantages will be had from the following description of certain illustrative embodiments, of which description the accompanying drawings form a part. All of the particulars of the embodiments herein described are intended for illustration only, and not as a limitation upon the scope of the invention.

In the drawings:

Fig. 1 is a schematic circuit diagram representing an illustrative embodiment of the invention;

Fig. 2 is a schematic drawing representing an illustrative multiple range meter scale;

Fig. 2A is a schematic diagram illustrating typical relationship of adjoining ranges of response;

Figure 3:
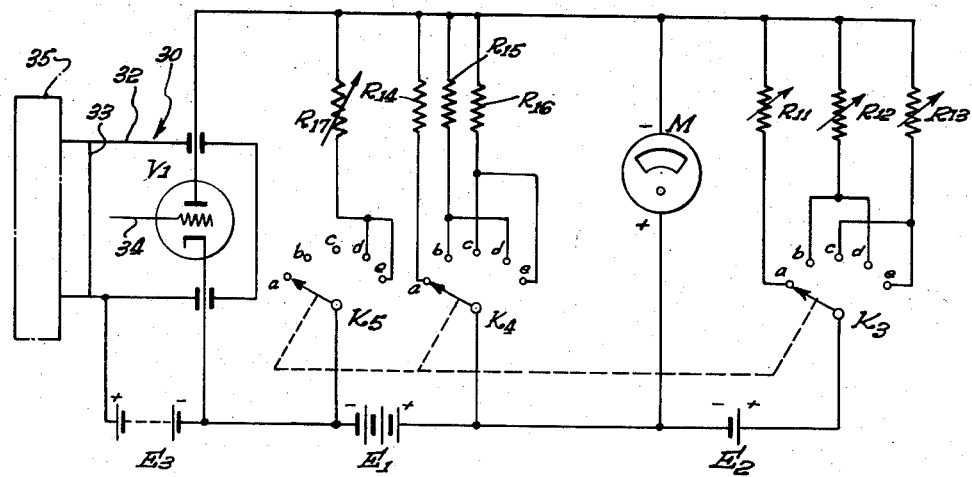
Fig. 3 is a schematic circuit diagram representing a second illustrative embodiment of the invention.

Fig. 1 represents an illustrative embodiment of the present invention, shown in somewhat simplified form for clarity of description. A power source is represented at E1 in the form of a battery. An input impedance is indicated at Z, connected in series with battery E1 and with a current measuring device, represented as the meter M. Input impedance Z is variable under control of means indicated schematically at 20. Control means 20 may, for example, cause impedance Z to vary as some definite function of a physical quantity to be measured. The nature of that variation may be entirely arbitrary, but is preferably of relatively simple form. Impedance Z may be of many widely different types including for example, a vacuum tube, a photoelectric tube, or a variable resistance that is mechanically actuated. When control means 20 causes impedance Z to vary in accordance with some physical variable, the current through the impedance varies correspondingly and the meter reading provides a measure of the physical quantity from which the condition of Z is derived. An adjustment of the sensitivity of meter M is preferably provided, and is typically represented in Fig. 1 as the variable resistance R1 connected in shunt to the meter.

The system of Fig. 1 includes a bucking circuit, connectible in shunt to meter M and including the bucking battery E2, the multiple position switch K1, and one or other of the variable bucking resistances R2 and R3. With switch K1 at position $a$, the bucking circuit is open and the entire current through input impedance Z passes through meter M and shunt R1, providing the most sensitive of the three available alternative ranges of the system, that range is represented schematically as Range 1 in Figs. 2 and 2A, and extends from a minimum or "zero" value Z1 to a maximum value M1. Any value of the variable in that range can be measured with the switch in position $a$.

With switch K1 in position $b$, meter M is shunted via battery E2 and bucking resistance R2. The current produced by E2 in that shunt circuit has a polarity in meter M opposite to the input current due to E1 and Z. The meter therefore responds to the difference of the two currents. By suitable selection and adjustment of E2 and R2, the same input current that produces maximum meter deflection with switch K1 in position $a$ may be made to produce zero meter deflection with the switch in position $b$. A second range is thereby made available, indicated schematically as Range 2 in Figs. 2 and 2A, and extending from a zero meter deflection Z2, which represents the same input current as deflection M1 in Range 1, to a maximum deflection M2, which typically represents an input current equal to twice that represented by M1. That relation is illustrated in row B of Fig. 2A, where Range 1 is represented as extending from 0 to some value N, and Range 2 from N to 2N.

With switch K1 in position $c$, resistance R3 is substituted for R2 in the bucking circuit, providing a third range of response. Resistance R3 is typically adjusted to such a value as to produce zero meter deflection (Z3 in Figs. 2 and 2A) when the input current has the same value as for maximum deflection M2 in Range 2. Maximum deflection M3 in Range 3 then corresponds typically to an input current three times that represented by maximum deflection M1 in Range 1.

The change of effective sensitivity of the meter due to the shunting action of the bucking circuit in switch positions $b$ and $c$ may be made small by suitable selection of components, and may be compensated if desired, as by simultaneous variation of shunt R1. The preferred relation between the three described ranges of response is represented schematically in Fig. 2A, in which the three Ranges 1, 2 and 3 are clearly shown as contiguous and distinct portions of an overall effective range of the system extending from Z1 to M3.

It will be assumed for illustration that there is available for checking the calibration of the system a calibration standard that can be applied to the system, for example via control means 20, to set input impedance Z at the value that is represented by the junction point of Ranges 1 and 2. That standard may be employed directly to check, and to correct if necessary, the calibration of those two ranges. For example, with switch K1 at position $a$, shunt resistance R1 may be adjusted to bring the meter to maximum deflection M1 in Range 1; and with switch K1 at position $b$, bucking resistance R2 may be adjusted to bring the meter to zero deflection Z2 in Range 2.

The system of Fig. 1 includes also circuit means that permit checking of the calibration of Range 3 by reference to the same standard already described. Two additional switching conditions of the system are provided. In both of those calibrating conditions of the system, a calibrating impedance, shown as R4, is connected in shunt to input impedance Z. In the first calibrating condition the bucking circuit already described is closed via R2; in the second condition it is closed via R3. Those switching functions may be obtained in any suitable manner. It is preferred, however, to provide two additional switch positions for switch K1, with respective switch contacts $d$ and $e$ connected to contacts $b$ and $c$, respectively; and to provide means acting automatically to insert R4 into the system when switch K1 is in position $d$ or $e$. For example, an additional switch or switch deck K2 may be provided, operated in gang with K1 as indicated by the broken line 21, with contacts $a$, $b$ and $c$ open and with contacts $d$ and $e$ both connected to R4, as shown. The circuit K2, R4 is connected in the system in shunt to input impedance Z.

To calibrate Range 3 with the described circuit, Ranges 1 and 2 are first preferably calibrated as already described. With the standard still applied to the input to the system, switches K1 and K2 are then shifted to position $d$, and calibrating resistance R4 is adjusted to bring the meter to maximum deflection. Since bucking resistance R2 is connected via contact $d$ of K1, the meter can be considered to be operating on Range 2, already described. However, the meter is subject not only to the regular current through input impedance Z (which is controlled by the standard and would by itself produce zero deflection in Range 2) but also to the additional current flowing in parallel to Z through R4. By adjustment of R4 the total of those currents is made to correspond to maximum deflection M2 of Range 2.

The switches are then shifted to position $e$, substituting R3 for R2 in the bucking circuit, but maintaining the described calibrating circuit through R4. The bucking circuit then corresponds to Range 3; and the combined current through Z and R4, which was adjusted to deflection M2 in Range 2, should produce zero deflection Z3 in Range 3. Without changing R4, bucking resistance R3 is now adjusted to produce that zero meter deflection, corresponding to Z3 in Range 3. That very simple operation permits all three alternative ranges of response of the system to be checked with reference to the same standard, which lies completely outside of one of the ranges.

Fig. 3 represents a system that is similar in many respects to that of Fig. 1, but illustrates certain circuit modifications, and further represents a specific illustrative means for varying the input impedance Z of Fig. 1.

An ionization chamber is shown schematically at 30, comprising a cylindrical shell 32 which may contain a suitable readily ionizable gas at any desired pressure, and which forms the positive electrode of the chamber; and a central wire 34, which forms the collecting electrode of the chamber and is connected directly to the control grid of the vacuum tube V1. The grid is otherwise electrically isolated from the circuit to be described. Chamber 30 is polarized as by the battery E3, of which the positive terminal is connected to shell 32 and the negative terminal to the cathode of tube V1. The tube is preferably of electrometer type, and mounted directly within chamber 30, as indicated, the cathode and plate leads being brought through the shell wall in insulated relation. High energy radiation entering the chamber through the shell wall, or through a special window 33 in the end of the chamber, produces ions in the chamber. The positive ions are collected on collecting electrode 34, tending to make the tube grid less negative with respect to the cathode the higher the intensity of the radiation. That positive ionization current to the grid is opposed by the electron space current that reaches the grid from the tube cathode and that increases with decreasing negative grid bias. At any given level of radiation, the tube grid reaches a definite corresponding potential at which the ionization current is just balanced by the space current. That equilibrium grid potential determines the plate current of the tube.

Meter M and battery E1 are connected in series in the plate circuit of tube V1, polarizing the tube in the usual manner and making meter M responsive to changes in the tube plate current. The plate impedance of the tube thus corresponds to the input impedance Z of Fig. 1. Ionization chamber 30 represents an illustrative example of the control means 20 of Fig. 1, controlling the plate current of tube V1 in accordance with the intensity of ionizing radiation present in the chamber.

Multiple ranges of meter response are provided in Fig. 3 by alternative bucking resistances connectible by switch K3 in series with battery E2 and in shunt to the meter. Bucking resistances R12 and R13 of Fig. 3 correspond to R1 and R2, respectively, of Fig. 1. A third bucking resistance is indicated at R11, connected via switch contact $a$ of switch K3. Battery E2 and resistance R11 are therefore connected as a bucking circuit in shunt to meter M when the system is operating on Range 1. Such a bucking circuit for Range 1 may be useful under a variety of conditions, for example, whenever the current through the input impedance is not zero for zero value of the quantity that controls it. It may also be useful when the input impedance is derived from the quantity to be measured in such a way that the current through the impedance is proportional to the logarithm of the value of the quantity.

An important advantage of the described input circuit is that the plate current is found to vary substantially as the logarithm of the intensity of radiation reaching chamber 30. Hence, if meter M is a conventional current responsive device which has a linear response, but which is provided with a logarithmic scale, that scale may be calibrated to read the radiation intensity directly. Moreover, a plurality of ranges may be provided, as in the manner already indicated, and those ranges may be so related that the radiation intensities represented by any point on the meter scale for two adjacent ranges differ always by the same factor. That factor is preferably made to equal an integral power of 10, say $10^n$. With that preferred arrangement, the first range of response of the system typically represents values of the quantity to be measured (the radiation intensity in the present instance) between some value $X$ and $X \cdot 10^n$, the second range represents values between $X \cdot 10^n$ and $X \cdot 10^{2n}$; the third values between $X \cdot 10^{2n}$ and $X \cdot 10^{3n}$, and so on, as indicated in row C of Fig. 2A. In such a system with overall logarithmic response, the current through the input impedance is typically not zero even at the "zero" end Z1 of Range 1.

Fig. 3 further illustrates switching means for changing the value of the meter shunt to provide different shunts for the respective ranges of response. Switch K4 is a multiple position switch, operated in gang with switch K3, and having the respective shunt resistances R14, R15 and R16 connected to its contacts $a$, $b$ and $c$. Positions $a$, $b$ and $c$ of switches K3 and K4 then select the respective Ranges 1, 2 and 3 of the system, inserting the appropriate bucking resistance R11, R12 or R13 and also inserting the appropriate resistance R14, R15 or R16 in shunt to meter M. In practice the values of those shunt resistances do not differ greatly; but they may compensate the shunting effect of the various bucking circuits already mentioned, and may further correct for slight departures of the input current from precisely logarithmic dependence on the radiation intensity in chamber 30. The shunt resistances may be variable, but are preferably set permanently at initial assembly of the system, and are therefore shown schematically as fixed resistors in Fig. 3.

Switches K3 and K4 are provided with two calibrating positions $d$ and $e$, contacts $d$ and $e$ of switch K3 being connected to bucking resistances R12 and R13, respectively. Contacts $d$ and $e$ of switch K4 are connected to shunt resistances R15 and R16, respectively, which are the shunt resistances for the respective Ranges 2 and 3. Switch K5, operated in gang with K3 and K4, has its contacts $a$, $b$ and $c$ open and its contacts $d$ and $e$ connected to calibrating resistance R17. In the latter two positions R17 is connected in shunt across vacuum tube V1.

Operation of switches K3, K4 and K5 shifts the system of Fig. 3 among its three operating ranges and its two calibrating positions, as already described for switches K1 and K2 of Fig. 1; and the calibrating procedure is similar except that adjustments of resistances R11, R12, R13 and R17 of Fig. 3 replace the described respective adjustments of R1, R2, R3 and R4 of Fig. 1. It will be noted that R11 in Fig. 3 is connected in series with bucking battery E2, whereas R1 in Fig. 1 is connected directly in shunt to the meter. However, in spite of that difference, variation of R1 and R11 can conveniently be employed for calibration adjustment of the respective systems in Range 1. Calibration of the system of Fig. 3 is carried out typically with a standard source of high energy radiation in such relation to ionization chamber 30 that the radiation within the chamber corresponds to the value represented by maximum deflection M1 of meter M in Range 1, and represented also by zero deflection Z2 of meter M in Range 2. Such a standard source of radiation may comprise a suitable quantity of some radioactive material having relatively long half-life, such, for example, as strontium 90, together with means for positioning that material in suitable definite relation to chamber 30 to produce the desired standard intensity of radiation within the chamber. Such a standard source is indicated schematically at 35.

With such a calibration standard corresponding to maximum meter deflection in Range 1 and to zero deflection in Range 2, R11 and R12 can be checked and adjusted directly. To check Range 3, calibration resistance R17 is first adjusted, with switches K3, K4 and K5 at position $d$, to give maximum meter deflection in Range 2. During that adjustment, the meter is shunted by R15, which is the appropriate shunt for Range 2. The switches are then shifted to position $e$ and R13 is adjusted to give zero deflection in Range 3. During that adjustment, the meter is shunted by R16, the appropriate shunt for Range 3. That change of shunt makes no practical difference in the current through calibrating resistance R17, since the value of R17 is in practice much greater than the combined resistance of the meter and its shunt, typically by a factor of ten or even a hundred.

In a system of the type represented in Fig. 3, each range of response may embrace any convenient range of variation of radiation intensity, for example a range corresponding to a factor of 1000. With that illustrative factor, the three ranges may, for example, extend respectively from $10^{-5}$ to $10^{-2}$, from $10^{-2}$ to 10, and from 10 to $10^4$ Roentgens per hour, as represented illustratively in row D of Fig. 2A. That particular choice of ranges corresponds to the general expressions in row C if $n=3$ and $X=10^{-5}$ Roentgens per hour. It is emphasized that the present invention permits calibration of Range 3 in such an illustrative system to be carried out with a standard source of radiation representing only 0.01 Roentgens per hour, which is 1000 times less than the lower limit of the range to be calibrated. Under those typical conditions, the invention not only permits very great economy and convenience, but also avoids the potential hazards of maintaining and using relatively powerful sources of radiation.

Figure 4:
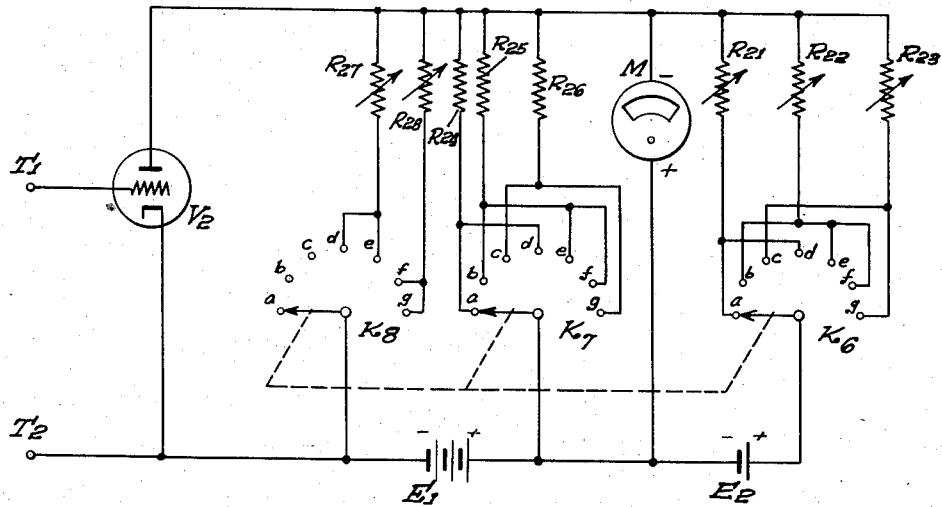
Fig. 4 is a schematic circuit diagram representing a third illustrative embodiment of the invention.

Fig. 4 represents a further embodiment of the invention, which is particularly adapted for calibration with a standard that corresponds to an intermediate point of Range 1, Fig. 4 also shows explicitly how the invention may be extended to the calibration of a succession of adjoining ranges. The basic circuit of Fig. 4 includes battery E1, meter M and a variable impedance connected in series. The variable impedance is shown as the vacuum tube V2, having its control grid and cathode connected to the respective input terminals T1 and T2. The potential between T1 and T2 may be controlled in any suitable manner, by means not explicitly shown, to cause the plate current in tube V2 to vary in a definite manner in accordance with some variable to be measured. One type of such control means has been illustratively described in connection with Fig. 3.

A bucking circuit is connectible in shunt to meter M, including in series battery E2, the multiple position switch K6, and a selected one of the bucking resistances R21, R22 and R23. Switch K6 (and also each of the ganged switches K7 and K8, to be described) has three operating positions $a$, $b$ and $c$, corresponding to response Ranges 1, 2 and 3 of the system; and has four calibrating positions $d$, $e$, $f$ and $g$. Switch K6 selects for the bucking circuit resistance R21 in positions $a$ and $d$; R22 in positions $b$, $e$ and $f$; and R23 in positions $c$ and $g$.

The switch K7 selects one of the shunt resistances R24, R25 and R26 for insertion in shunt to meter M, R24 being inserted in switch positions $a$ and $d$; R25 in positions $b$, $e$ and $f$; and R26 in positions $c$ and $g$.

The switch K8 has its contacts $a$, $b$ and $c$ open. In positions $d$ and $e$ it inserts the calibrating resistance R27 into the system in shunt to input impedance V2; and in positions $f$ and $g$ it similarly inserts calibration resistance R28. Each of the described bucking and calibrating resistances is typically variable. Shunt resistances R24, R25 and R26 may also be variable, but are shown as fixed resistances since the calibration procedure to be described does not require their variation.

To check the calibration of the system of Fig. 4 and to correct the values of the three bucking resistances R21, R22 and R23, the potential between input terminals T1 and T2 is controlled in accordance with a reference standard of any suitable type that corresponds to a known meter reading in Range 1, such, for example, as the reading indicated at S in Fig. 2. That control of the input potential is maintained throughout the calibration procedure.

With the switches K6, K7 and K8 in position $a$, R21 is adjusted to give a reading of S in Range 1, completing the calibration check of Range 1. The switches are then shifted to position $d$ and R27 is adjusted to give maximum deflection M1 in Range 1. The switches are then shifted to position $e$, and R22 is adjusted to give zero deflection Z2 in Range 2, completing the calibration check for Range 2. The switches are then shifted to position $f$ and R28 is adjusted to give maximum deflection M2 in Range 2. The switches are then shifted to position $g$, and R23 is adjusted to give zero deflection Z3 in Range 3, completing the calibration check for Range 3.

The system and the calibration procedure just described may employ a calibration standard for which the meter reading S in Range 1 is at zero deflection Z1. It is then obvious that an adjoining range lower than Range 1 may be provided, and may be calibrated directly in the manner already described for Range 1 for Fig. 1.

The system of Fig. 4 emphasizes the fact, which is also true of the previous embodiments, that each calibrating resistance is employed at two switch positions. In one of those switch positions the calibrating resistance itself is adjusted; and in the other position the adjusted calibrating resistance is employed for adjusting the bucking resistance of the succeeding range. In the first of those switch positions the meter has its maximum deflection for one response range; and in the second switch position the meter has zero deflection for the next higher response range.

It will be evident to those skilled in the art that many changes may be made in the particular systems that have been described as illustrations of the invention without departing from the proper scope of the invention, which is defined in the appended claims.

In particular, it is common practice to provide additional switch positions for various purposes, such as an "off" condition of the system with all battery circuits open and the meter shorted; and test positions for checking the several battery voltages with meter M. Further, in the systems of Figs. 1 and 3, for example, the circuitry relating uniquely to Range 1 may be omitted, and the invention may be utilized with relation to the remaining ranges of response.

It is sometimes convenient to provide adjacent ranges of response with an appreciable region in common, rather than the single common point assumed in the preceding description. The present invention may then utilize any point of the common region as the maximum deflection of one range and the zero deflection of the next higher range. Although the invention has been described with particular reference to direct current operation, it relates also to systems for alternating current operation, in which the various impedances shown illustratively as pure resistances may be of the more general types commonly associated with alternating currents.

Any of the variable impedances mentioned above and in the claims may, unless otherwise stated, be made up of fixed and variable portions connected in series or parallel. Variation of the value of a component may be made either continuously or in discrete steps, as by a switching operation. And switching of a circuit to open condition is equivalent to a change of its impedance to a substantially infinite value. Thus, for example, when switch K1 of Fig. 1 is in position $a$, the bucking circuit may be considered to be connected in shunt to meter M with substantially infinite bucking resistance.

I claim:

1. In an electrical system that includes a power source, a variable input impedance and a meter connected in series, and bucking circuit means comprising a bucking power source and means selectively actuable to connect the bucking power source in shunt to the meter in opposite polarity to the first said power source to render the meter responsive to a plurality of adjoining ranges of current in the input impedance; calibrating means comprising a variable impedance connected in series with the bucking circuit means, a variable calibrating impedance, and switching means for selectively inserting the calibrating impedance in shunt to the input impedance.

2. In an electrical system that includes a power source, a variable input impedance and a meter connected in series, bucking circuit means connected in shunt to the meter and including in series bucking impedance means and a source of potential of polarity opposing said power source in the meter, and operating switching means for shifting the value of the bucking impedance means among a plurality of individually settable values to render the meter responsive to respective adjoining ranges of input current; calibrating means comprising a variable calibrating impedance and calibrating switching means operable to one position to insert the calibrating impedance in shunt to the input impedance and to select a value of the bucking impedance means corresponding to one response range of the meter, the calibrating switching means being operable to another position to insert the calibrating impedance in shunt to the input impedance and to select a value of the bucking impedance means corresponding to a response range of the meter adjacent said one response range.

3. In an electrical system that includes a power source, a variable input impedance and a meter connected in series, a bucking circuit means connected in shunt to the meter and including in series a bucking impedance means and a source of potential of polarity opposing said power source in the meter, shunt impedance means connected in shunt to the meter, and operating switching means for shifting the respective impedance values of the bucking impedance means and of the shunt impedance means among a plurality of sets of values to render the meter responsive to respective adjoining ranges of input current; calibrating means comprising a variable calibrating impedance, and calibrating switching means operable to one position to insert the calibrating impedance in shunt to the input impedance and to select a set of values of the bucking impedance means and the shunt impedance means corresponding to one response range of the meter, the calibrating switching means being operable to another position to insert the calibrating impedance in shunt to the input impedance and to select a set of values of the bucking impedance means and the shunt impedance means corresponding to a response range of the meter adjacent said one response range.

4. In an electrical system that includes a power source, a variable input impedance and a meter connected in series, and bucking circuit means comprising a bucking power source and means selectively actuable to connect the bucking power source in shunt to the meter in opposite polarity to the first said power source to render the meter responsive to a plurality of adjoining ranges of current in the input impedance; calibrating means comprising a variable bucking impedance connectible in series with the bucking circuit means, a variable calibrating impedance, and switching means shiftable to one calibrating position for adjustment of the calibrating impedance and shiftable to a second calibrating position for adjustment of the bucking impedance, said switching means acting in said one position to insert the calibrating impedance in shunt to the input impedance and to disconnect the bucking impedance, and acting in said second position to insert the calibrating impedance in shunt to the input impedance and to connect the bucking impedance in series with the bucking circuit means.

References Cited in the file of this patent

UNITED STATES PATENTS

| | | |
|---|---|---|
| 2,413,389 | Smith | Dec. 31, 1946 |
| 2,459,081 | Kunz | Jan. 11, 1949 |
| 2,481,500 | Crowl | Sept. 13, 1949 |
| 2,525,705 | Moore | Oct. 10, 1950 |